Patented Dec. 24, 1935

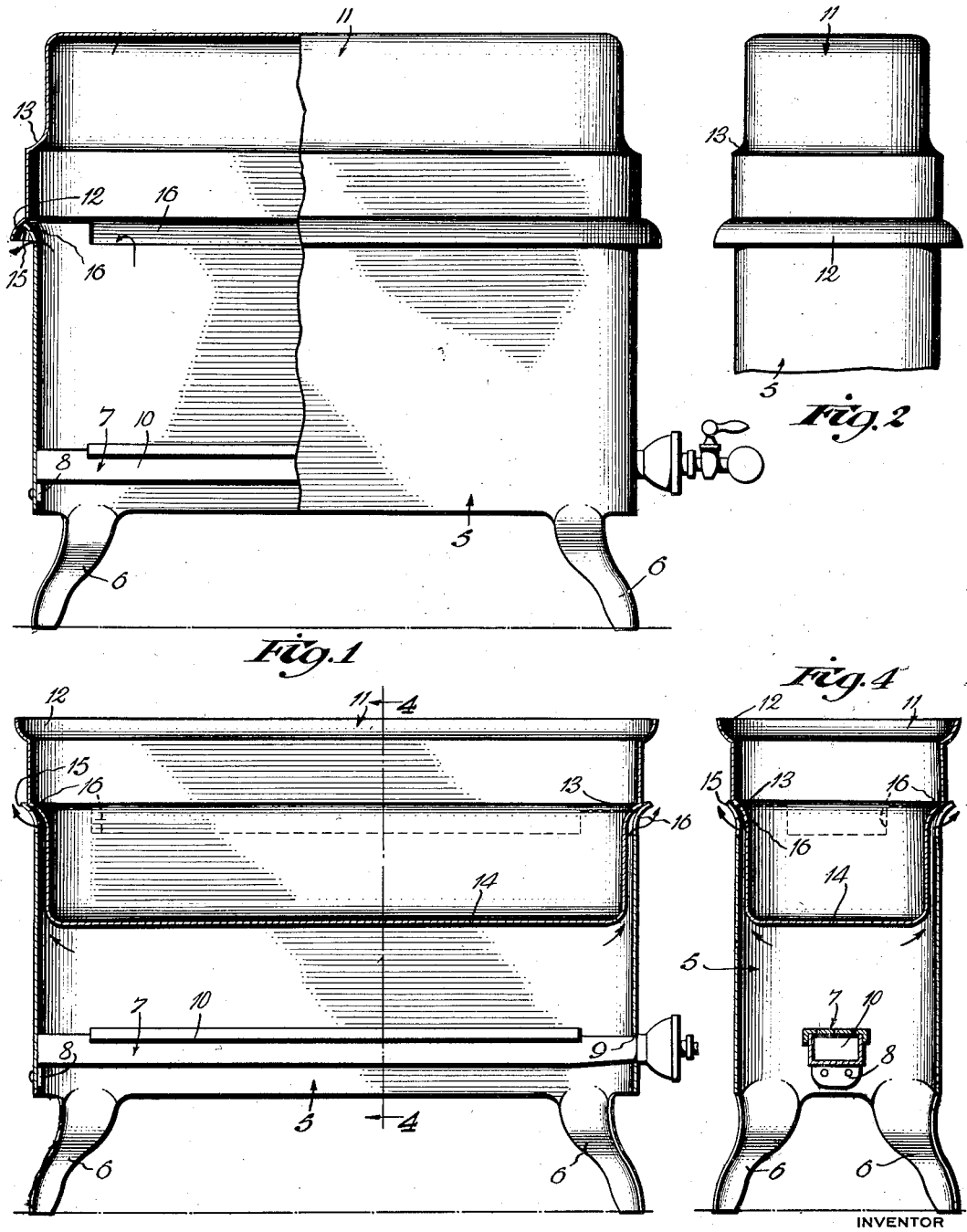

2,025,594

UNITED STATES PATENT OFFICE 2,025,594

HEATER

John B. Knauss, Sr., Portsmouth, Ohio

Application July 6, 1934, Serial No. 733,992

6 Claims. (Cl. 126—85)

This invention relates to heating apparatus and is particularly directed to a small heater unit adapted for heating small rooms.

It is the object of this invention to provide a heater of this character which is formed of a minimum number of parts, preferably stampings, to produce a compact inexpensive simple construction, which is extremely efficient for heating small spaces such as bath rooms, which can be conveniently carried to the point of use, and which is particularly useful in that it includes means for heating water at local points in the house independently of the conventional house water heating plant or other sources of hot water which are not always in operation or which do not always supply a sufficient amount of hot water.

By the present improvement the same heating unit which supplies the room heat provides an almost immediate supply of hot water at any required time for a multiplicity of uses such as shaving, sponge baths, hot water bottles, milk or medicine warming, and many others.

It is preferable to provide that the dome of the heater upon inversion, forms the water container.

Other objects and further advantages will be more fully apparent from a description of the accompanying drawing, in which:

Figure 1 is a front view, partly in section, showing the dome in place for room heating purposes only.

Figure 2 is a fragmentary end view of Figure 1.

Figure 3 is a longitudinal sectional view of the heater, showing the dome inverted for use as a container for water to be heated.

Figure 4 is a sectional view taken on line 4—4, Figure 3.

The heater described in general comprises three parts or units, namely, a body, a dome and the heating unit. The heating unit may be of any character and may use any type of fuel available such as gas, gasoline, kerosene, electricity, etc.

Referring to the drawing, the body is indicated at 5. The body is preferably formed by stamping from a single sheet of material to form a one-piece structure which incorporates integral legs 6. The body, as shown, is elongated either oval or rectangular. It may be round if desired. A heating unit 7 in the form of a gas burner is incorporated and is inserted in the lower end of the body and supported therein. The inner end of the heater unit rests on a lug 8 and the outer end is supported in the aperture 9 in the end wall of the body. As stated, this unit can be of any conventional structure. In the present case, described in general, it incorporates a long perforated tube 10.

The cap or dome 11 of the heater is of pan shape for the purpose of providing a water receptacle when inverted. Described in detail, the combined dome and receptacle 11 is of considerable depth. Its edge is flared to provide a curved edge or upper offset 12. The side walls of the receptacle include an offset 13 forming a reduced bottom portion 14 for the receptacle which will fit within the body of the heater as shown in Figure 3 when the dome is inverted.

The offset shoulder 13 is rounded and will rest on an outwardly curved rim 15 of the body. When this combination element is used as a dome, its curved edge or upper offset will rest on the rounded rim 15 of the body. Accordingly, if the heater is used for the purpose of warming the room, the combination element is used solely as a dome as shown in Figures 1 and 2. Heat escape openings 16, formed by notching the rim of the body, permit flow of hot air from the heater under the edge of the dome. These openings may be in the form of perforations.

When used as a combined air and water heater, the dome element is inverted and the reduced lower portion 14 thereof depends inside the heater body adjacent the heater unit. In this position the offset shoulder 13 rests on the rim 15 of the body. There is sufficient clearance between the sides of that portion of the element projected into the heater body and the walls of the heater body to permit flow of hot air upwardly and from the heater element through the heat escape openings 16 heretofore set forth.

The receptacle afforded by this invention is of considerable depth and will hold a large amount of water. It projects or depends close to the heating unit and therefore the water is quickly heated.

Having described my invention, I claim:

1. A heater, comprising, a body open at the top and bottom and including legs, a heating unit mounted in the lower end of said body, and an invertible dome for said body in the form of a receptacle, said dome having two offset shoulders, one adjacent the rim thereon and the other midway of its depth, said shoulders alternately engageable with the upper edge of the body in the dome position and water containing position of use of the dome respectively.

2. A heater, comprising, a body open at the upper and lower ends thereof and including support legs, a heat supply unit supported in the lower end of said body, the upper edge of said body flared outwardly and notched, a combination dome and receptacle element adapted to be mounted on the flared upper edge of said body, said element including a bared rim and a rounded offset shoulder midway of its depth, said flared rim adapted to rest on the flared upper edge of the body in the dome position of the element and said offset shoulder adapted to rest on the flared upper edge of the body in the water containing position of said element.

3. A heater, comprising, a body having an open upper end, a heat supply unit in said body, a closure element for said open upper end of said body including a water receptacle, said closure element being invertible in relation to the open upper end of said body, and support means on said closure element operating with said body for mounting said closure element in either position.

4. A heater, comprising, a body open at the upper and lower ends thereof, including support legs, a heat supply unit supported in the lower end of said body, the upper edge of said body flared outwardly and including heat flow openings, a combination dome and water receptacle element having a rim adapted to be mounted on the flared upper edge of said body in the dome position, said element including a rounded offset shoulder midway of its depth, said offset shoulder adapted to rest on the flared upper edge of the body in the water containing position of said element, the depending portion of said element being spaced from the walls of the body for heat flow between the same.

5. A heater unit, comprising, a casing forming the body of the heater and having open upper and lower ends, a supply unit mounted in said body, a pan-shaped invertible closure element engageable on the open upper end of said casing, said casing including means for supporting the closure element in normal or inverted position, and said closure element including support means cooperating with the support means of the casing, a portion of the closure element being in dependent position in the casing when the closure element is in inverted position.

6. A heater unit, comprising, a casing forming the body of the heater and having open upper and lower ends, a heat supply unit in said casing, a pan-shaped invertible closure element engageable on said open upper end of said casing, said casing including means supporting the closure element in normal or inverted position, and support means on the closure element cooperating with the supporting means on the casing, a portion of said closure element being disposed in dependent position in the casing when in one of said positions, said heater casing including heat escape openings at its upper end and said dependent portion of said closure element spaced from the walls of the casing for heat flow.

JOHN B. KNAUSS, Sr.